(12) United States Patent
Huang et al.

(10) Patent No.: US 8,417,971 B2
(45) Date of Patent: Apr. 9, 2013

(54) DATA PROCESSING DEVICE AND DATA PROCESSING METHOD

(75) Inventors: Zhen Huang, Beijing (CN); Zhongqing Li, Beijing (CN)

(73) Assignee: Lenovo (Beijing) Limited (CN)

( * ) Notice: Subject to any disclaimer, the term of this patent is extended or adjusted under 35 U.S.C. 154(b) by 491 days.

(21) Appl. No.: 12/655,384

(22) Filed: Dec. 30, 2009

(65) Prior Publication Data

US 2010/0174926 A1 Jul. 8, 2010

(30) Foreign Application Priority Data

Jan. 5, 2009 (CN) .......................... 2009 1 0076494

(51) Int. Cl.
*G06F 1/26* (2006.01)
*G06F 3/023* (2006.01)

(52) U.S. Cl. ............. 713/300; 713/310; 710/10; 710/14

(58) Field of Classification Search .................. 713/300, 713/310; 710/10, 14
See application file for complete search history.

(56) References Cited

U.S. PATENT DOCUMENTS

| | | | |
|---|---|---|---|
| 5,680,536 A * | 10/1997 | Tyuluman | 714/1 |
| 7,490,173 B2 * | 2/2009 | Wajda | 710/6 |
| 7,526,586 B2 * | 4/2009 | Huber et al. | 710/72 |
| 7,539,883 B2 * | 5/2009 | Kojou et al. | 713/320 |
| 7,711,324 B2 * | 5/2010 | Wutka | 455/41.2 |
| 2008/0024433 A1 * | 1/2008 | Gunther et al. | 345/156 |

FOREIGN PATENT DOCUMENTS

| | | |
|---|---|---|
| CN | 2337611 Y | 9/1999 |
| CN | 2638140 Y | 9/2004 |
| CN | 1652551 A | 8/2005 |

* cited by examiner

*Primary Examiner* — Thuan Du
(74) *Attorney, Agent, or Firm* — Schwegman Lundberg & Woessner, P.A.

(57) ABSTRACT

Disclosed is a data processing device, which comprises: an input device for generating first input information; a central processor; an embedded controller, connected to the power supply, the input device and the central processor. When the data processing device is powered on, the embedded controller is adapted to control the power supply to supply power to the input device and the central processor; process the first input information as second information, which can be identified by the central processor; and send the second information to the central processor. When the data processing device is powered off or sleeping, the embedded controller is adapted to control the power supply to supply power to the input device; detect whether a terminal device comprising an operating system is connected and generate a detection result; electrically connect to the terminal device when the detection result indicates that the terminal device comprising the operating system is connected; process the first input information to obtain third input information, which can be processed by at least one program running based on the operating system in the terminal device; and send the third input information to the terminal device. The present invention provides a data processing device and data processing method for solving the inconvenient operations of the traditional handsets and the like terminal devices.

5 Claims, 4 Drawing Sheets

DATA PROCESSING DEVICE AND DATA PROCESSING METHOD

RELATED APPLICATION

This application claims the benefit of priority, under 35 U.S.C. Section 119, to Chinese Patent Application Serial No. 200910076494.0, filed on Jan 5, 2009, which is incorporated herein by reference in its entirety.

FIELD OF THE INVENTION

The present invention relates to data processing devices, and especially, to a data processing device and a data processing method.

BACKGROUND OF THE INVENTION

Keyboards of conventional handsets and handheld computers would not be very large due to their small sizes, thus leading to inconvenient operations for users.

In particular, the handsets typically include only number keys. Thus, a user has to switch input methods when it is needed to input alphabets, and further adopts a multiplexing manner to perform an input selection for the alphabets. This affects an input speed and leads to a very low efficiency. The keyboards of some smart phones and handheld computers adopt a small keyboard similar to the standard QWERTY keyboard, however, due to its dimension space constraint, only a single finger or two fingers can be used to perform a sequential input, which leads to very inconvenient operations and poor input efficiencies.

While some of the existing handsets use similar folding keyboards, or soft keyboards and the like, additional equipments are usually needed during the operations, thus leading to inconvenient carryover and use.

On the other hand, screens of the handsets are becoming larger, however, users still rely on a Five-Way key to move a grid by a grid in position control, which leads to inconvenient operations in comparison with the operations using a mouse and the like devices on a portable laptop computer.

Some large flat computers are not configured with keyboards and perform inputs by means of soft keyboards displayed on touch pads. However, this leads to low input efficiencies.

Although some flat computers are configured with physical keyboards, efficiencies thereof are low since it is inconvenient to carry such keyboards.

Conventionally, if a handset (or a PDA) shares an input device of a notebook, such as a keyboard, a track pad, a track-point, and the like, it is needed to connect to a notebook, for example via an infrared interface, or a Bluetooth interface, a USB cable and the like, when the notebook is powered on. Then, the handset can be operated by means of the input device of the notebook. However, it is needed to power the notebook on and operate its operating system, which leads to large power consumption and a waste of notebook energy, especially in case of powering with a battery. Thus, the conventional method mentioned above is complicated and time-consuming.

SUMMARY OF THE INVENTION

An object of the present invention is to provide a data processing device and data processing method. With the device and method according to present invention, the operation efficiency of the terminal devices would be increased.

The present invention provides a data processing device, comprising:
a power supply;
an input device, adapted to generate first input information under an operation from a user;
a central processor; and
an embedded controller, connected to the power supply, the input device and the central processor, respectively;
wherein when the data processing device is powered on, the embedded controller is adapted to control the power supply to supply power to the input device and the central processor; process the first input information as second information, which can be identified by the central processor; and send the second information to the central processor;
when the data processing device is powered off or sleeping, the embedded controller is adapted to control the power supply to supply power to the input device; detect whether a terminal device comprising an operating system is connected or not and generate a detection result; electrically connect to the terminal device when the detection result indicates that the terminal device comprising the operating system is connected; process the first input information to obtain third input information, which can be processed by at least one program running based on the operating system in the terminal device; and send the third input information to the terminal device.

Preferably, the data processing device further comprises an interface unit connected to the embedded controller. The interface unit is adapted to connect to the terminal device.

Preferably, the data processing device further comprises a switching unit connected to the interface unit, the central processor and the embedded controller, respectively; and
the embedded controller is adapted to control the switching unit to connect to the central processor when the data processing device is powered-on, and to control the switching unit to connect to the interface unit when the data processing device is powered off.

Preferably, the data processing device further comprises a trigger selecting unit connected to the embedded controller, the trigger selection unit is adapted to obtain a trigger command from the user; and the embedded controller is adapted to control the switching unit to connect to the central processing based on a first trigger command and control the switching unit to connect to the interface unit based on a second trigger command, when the data processing device is powered-on.

The present invention further provides a data processing method applied in a data processing device. The data processing device comprises a power supply, an embedded controller, an input device and a central processor. When the data processing device is powered on, the embedded controller is adapted to control the power supply to supply power to the input device and the central processor; process first input information, which is generated when the input device is operated by a user, as second information that can be identified by the central processor; and send the second information to the central processor.

When the data processing device is powered-off or sleeping, the method comprises steps of:
controlling the power supply to supply power to the input device; detecting whether a terminal device comprising an operating system is connected or not, and generating a detection result;

electrically connecting to the terminal device when the detection result indicates that the terminal device comprising the operating system is connected;

processing the first input information to obtain third input information, which can be processed by at least one program running based on the operating system in the terminal device; and sending the third input information to the terminal device.

When the data processing device according to the embodiment of the present invention is powered-off or sleeping, the embedded controller is adapted to control the power supply to supply power to the input device; detect whether a terminal device comprising an operating system is connected and generate a detection result; electrically connect to the terminal device when the detection result indicates that the terminal device comprising the operating system is connected; processing first input information generated by the input device to obtain third input information; and send the third input information to the terminal device. Particularly, the third input information can be processed by at least one program running based on the operating system in the terminal device.

In this way, a keyboard and/or a mouse and/or a touch pad and the like input devices may normally operate when the data processing device is power-off or sleeping. Then, first input information input by the keyboard and/or the mouse and/or the touch pad may be converted into third input information, and the third input information may be sent to the terminal device for use when a terminal device such as a handset or a handheld computer performs an input.

DETAILED DESCRIPTION OF THE PREFERRED EMBODIMENTS

The present invention provides a data processing device so as to facilitate the operations of the terminal devices such as handsets while extending the application field of the data processing device.

Figure 1:
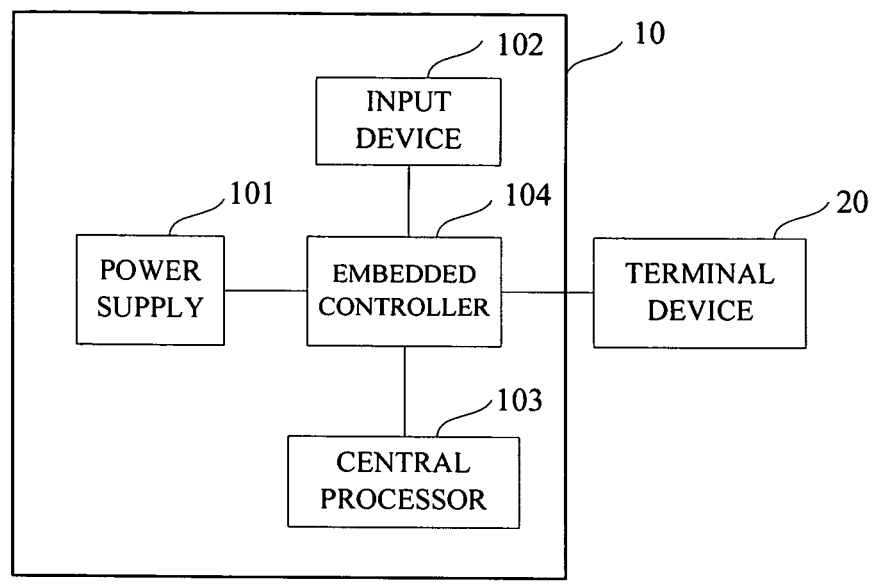
FIG. 1 is a structural diagram of a data processing device according to a first embodiment of the present invention.

Referring to FIG. 1 which shows a structural diagram of a data processing device according to a first embodiment of the present invention.

In the first embodiment of the present invention, a data processing device 10 comprises:

a power supply 101;

an input device 102 adapted to generate first input information under an operation from a user;

a central processor (CPU) 103;

an embedded controller 104, connected to the power supply 101, the input device 102 and the central processor 103, respectively.

When the data processing device 10 is powered on, the embedded controller 104 is adapted to control the power supply 101 to supply power to the input device 102 and the central processor 103, process the first input information as second information, and send the second information to the central processor 103.

The second information can be identified by the central processor 103.

When the data processing device 10 is power off or sleeping, the embedded controller 104 is adapted to control the power supply 101 to supply power to the input device 102, detect whether a terminal device 20 comprising an operating system is connected and generate a detection result.

When the detection result indicates that the terminal device 20 comprising the operating system is connected, the data processing device 10 is electrically connected to the terminal device 20 (i.e. establishing a communication with the terminal device 20, so as to enable a communication protocol between the data processing device 10 and the terminal device 20); processes the first input information to obtain third input information, which can be processed by at least one program running based on the operating system in the terminal device 20; and sends the third input information to the terminal device 20.

For example, the embedded controller (EC) 104 processes first input information, which is generated by the input device 102 under an operation from a user, as third input information conforming to the communication protocol with the terminal device 20. After receiving the third input information, the terminal device 20 converts the third input information into corresponding input information, which can be processed and used by a program in the terminal device 20.

When the data processing device according to the first embodiment of the present invention is powered off or sleeping, the embedded controller controls the power supply to supply power to the input device; detects whether a terminal device comprising an operating system is connected, and generates a detection result; electrically connects to the terminal device, that is to establish a communication with the terminal device, when the detection result indicates that the terminal device comprising the operating system is connected; processes first input information generated by the input device to obtain third input information; and sends the third input information to the terminal device. Particularly, the third input information can be processed by at least one program running based on the operating system in the terminal device.

In this way, input devices such as a keyboard and/or a mouse and/or a touch pad may normally operate when the data processing device is powered off or sleeping. Then, the first input information input by the keyboard and/or the mouse and/or the touch pad is converted into the third input information, and the third input information is sent to the terminal device for use when a terminal device such as a handset or a handheld computer performs an input.

The data processing device according to the embodiment of the present invention further comprises an interface unit connected to the embedded controller 104. The interface unit is adapted to connect to the terminal device 20. Corresponding detailed description will be given in a second embodiment of the present invention.

The data processing device according to the embodiment of the present invention further comprises a switching unit, connected to the interface unit, the central processor 103 and the embedded controller 104, respectively.

The embedded controller 104 is adapted to control the switching unit to connect to the central processor when the data processing device 10 is powered on, and to control the switching unit to connect to the interface unit when the data processing device 10 is powered off.

The data processing device according to the embodiment of the present invention further comprises a trigger selecting unit connected to the embedded controller 104. The trigger selecting unit is adapted to obtain a trigger command from the user.

The embedded controller 104 is adapted to control the switching unit to connect to the central processing based on a first trigger command and control the switching unit to connect to the interface unit based on a second trigger command, when the data processing device 10 is powered on.

The data processing device according to the embodiment of the present invention may be embodied as a portable computer. A data processing procedure will be illustrated in detail by taking a computer as an example.

Figure 2:
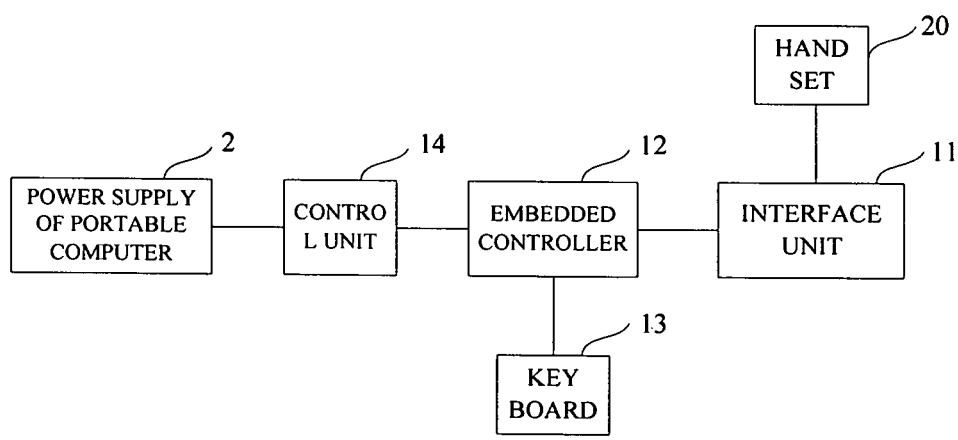
FIG. 2 is a structural diagram of a data processing device according to a second embodiment of the present invention.

Referring to FIG. 2, in which a structural diagram of a data processing device according to a second embodiment of the present invention is shown.

The data processing device according to the second embodiment of the present invention may be embodied as a portable computer, which comprises: a host, a display connected to the host, an input device connected to the host, and an interface unit 11 for connecting to an interface unit inputting information-enabled terminal device such as a handset 20 or a handheld computer.

The input device is provided on the host and connected to an embedded controller 12. When the host is powered off, operations are under control of the embedded controller 12. The input device may be a keyboard 13 and/or a mouse and/or a touch pad.

The computer further comprises the embedded controller 12 connected to the interface unit 11. The embedded controller 12 is adapted to control the input devices to be operated, and to process the first input information generated by the input devices as third input information, when the host is powered off, that is, the data processing device is powered off. Particularly, the third input information can be processed by at least one program running based on an operating system in the terminal device such as the handset.

A control unit 14 may be provided between the embedded controller 12 and a power supply 2 of the portable computer. The embedded controller (EC) 12 has two states, one is its stand-by state, in which the embedded controller 12 stays in its stand-by state once the portable computer's battery is charged when the portable computer is powered off. In this case, the embedded controller 12 mainly detects whether the control unit 14 for the power supply of the portable computer is operating, i.e. whether a button for a power switch has been pressed. The other state is an operating state, in which the embedded controller 12 is responsible for control of a keyboard and operations of a power management system when the portable computer is powered on. Particularly, when the portable computer is powered on, the embedded controller 12 is adapted to control the power supply 2 to supply power to the input device such as the keyboard and the central processor, process first input information, which is generated by the input devices, so as to obtain the second information, and send the second information to the central processor. Here, the second information can be identified by the central processor.

Particularly, the embedded controller may comprise a processing unit. The processing unit is adapted to process the first input information to obtain third input information, which can be processed by at least one program running based on the operating system in the terminal device.

The terminal device further comprises a conversion unit for use in processing. Specifically, the conversion unit converts the received third input information, which has been translated by the processing unit, into information such as ASCII codes, which can be identified by the terminal device and processed and used by at least one program running based on the operating system in the terminal device.

When the interface unit 11 of the portable computer 1 according to the first embodiment of the present invention is connected to the interface unit inputting information-enabled terminal device such as the handset 20 or the handheld computer, since the control unit 14 is set between the embedded controller 12 and the power supply 2 of the portable computer, when the interface unit 11 detects there are other devices accessing, the control unit 14 enables under control of the embedded controller 12 the power supply of the portable computer to supply power to the input devices when the host is powered off. In this way, the input devices may normally operate. Then, the first input information input by the keyboard 13 and/or the mouse and/or the touch pad is converted into third input information, and the third input information is sent to the terminal device via the interface unit 11, for use when the interface unit inputting information-enabled terminal device such as the handset 20 or the handheld computer performs an input.

An interface connected to the interface unit 11 of the portable computer is provided at the interface unit inputting information-enabled terminal device such as the handset 20 or the handheld computer, and is adapted to receive an input from the interface unit 11.

Alternatively, the interface unit 11 may be a serial port, a parallel port, a USB, an Infrared interface, a Bluetooth and the like forms. A specific form of the interface unit 11 relies on requirements for power consumption and complexity.

The embedded controller 12 provides a serial port and an Infrared interface. As the serial port is simpler and less power-consumed, preferably, the interface unit 11 may be in a form of the serial port possessed by the embedded controller 12.

If the handset 20 or the handheld computer needs to adopt other forms of interface, a USB interface or a Bluetooth interface may be extended on the EC12. However, the USB interface and the Bluetooth interface are more power-consumed.

A mounting rack 4 may be arranged on the portable computer for placing the handset 20 or handheld computers and the like terminals devices, in order to facilitate a stable connection between the portable computer and the interface unit inputting information-enabled terminal device such as the handset 20 or the handheld computer, while preventing the interface unit inputting information-enabled terminal device such as the handset or the handheld computer from wobbling.

The mounting rack 4 has an inward recess. The interface unit inputting information-enabled terminal device such as the handset 20 or the handheld computer can be vertically inserted into the mounting rack 4 so that a user can see corresponding input contents on a screen of the interface unit inputting information-enabled terminal device while he is operating the keyboard 13 of the portable computer.

Particularly, the interface unit 11 may be arranged on the bottom of or inside the mounting rack 4, such that an interface of the interface unit inputting information-enabled terminal device may be connected to the interface unit 11 when the interface unit inputting information-enabled terminal device is placed within the mounting rack 4.

Particularly, the mounting rack 4 may be a plug-in entity for the interface unit inputting information-enabled terminal device, which is arranged on the portable computer's base. In this way, the interface unit inputting information-enabled terminal device may be erectly placed in front of the portable computer's screen. The interface unit 11 arranged inside the plug-in entity for the handset may adopt a serial port. Alternatively, the interface unit 11 may adopt different adapter interfaces.

For example, it is needed to provide different adapters when different handsets 20 or handheld computers are installed within the plug-in entity for the handset. For example, a serial port may be adapted into a USB port.

When the portable computer is operating, the embedded controller 12 may be also for communications between the handset 20 and the portable computer and may enable data interactions between the handset 20 and the portable computer.

In this way, the handset 20 (or PDA) can share an input device of the portable computer, such as a keyboard, a touch pad, trackpoint and the like, when the portable computer is powered off, so as to operate applications in the handset 20, for example sending a short message, moving an icon and the like.

Particularly, the other interface unit inputting information-enabled devices may be a handset or a handheld computer, and may be connected to the other computers. Some computers do not have keyboards, but only soft keyboards. However, the soft keyboards can not be operated as fast as real keyboards.

When a keyboard of a computer goes wrong, the other interface unit inputting information-enabled devices may serve as the keyboard, specifically by connecting the computer to the interface unit 11. Other details are similar to the previously described embodiments, thus no detailed description will be given here.

Figure 3:
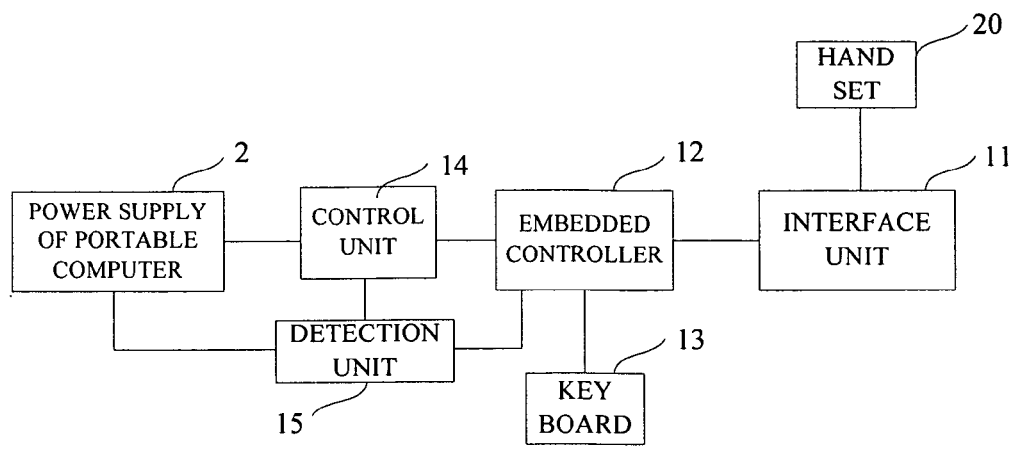
FIG. 3 is a structural diagram of a data processing device according to a third embodiment of the present invention.

Referring to FIG. 3, in which a structural diagram of a data processing device according to a third embodiment of the present invention is shown.

The data processing device according to the third embodiment of the present invention may be embodied as a portable computer. The data processing device according to the third embodiment differs from that in the second embodiment in that the data processing device comprises a detection unit 15 connected to the embedded controller 12 additionally.

The detection unit 15 is used to detect whether the interface unit 11 is connected to the handset 20 or the handheld computer. This detection is also controlled by the EC 12 in its stand-by state. Specifically, the EC 12 controls the control unit 14 to enable the power supply 2 of the portable computer to supply power to the input devices such as the keyboard 13 and/or the mouse and/or the touch pad and the like. In this way, the input devices may normally operate. Then first input information input by the input devices may be processed into the third input information, and the third input information may be sent to the terminal device via the interface unit 11, to be used when the interface unit inputting information-enabled terminal device such as the handset 20 or the handheld computer performs an input.

Therefore, EC 12 always stays in its stand-by state and is supplied with power by the power supply 2 of the portable computer. When the detection unit 15 detects that the interface unit inputting information-enabled terminal device such as the handset 20 or the handheld computer is in connection, a key (not shown in the drawing figures) can be triggered to wake the EC12 up, so as to make the EC12 turn into its operating state. Then, the input device such as the keyboard 13, the interface unit 11 and so on are supplied with power by controlling the control unit 11 (also referred to as a power switch). Thereafter, the interface unit inputting information-enabled terminal device such as the handset 20 or the handheld computer may be disconnected, the power supply of the portable computer may be turned off, then and the EC 12 may return to the its stand-by state again.

The portable computer 1 comprises the detection unit 15 connected to the embedded controller 12, thus it is more accurate and convenient to control the control unit 14.

When the detection unit 15 detects an interface unit inputting information-enabled device, such as the handset 20 or the handheld computer, is inserted into the mounting rack 4, and the interface unit 11 is connected to the interface unit inputting information-enabled terminal device, the embedded controller 12 controls the control unit 14 to turn on the power supply 2 for the portable computer, so as to enable the power supply 2 of the portable computer to supply power to the keyboard 13. Now, the embedded controller 12 turns from sleeping to operating and detects the interface unit 15, performs an initialization, and establishes a communication with the interface unit inputting information-enabled terminal device.

The portable computer 1 may comprise a translation unit (i.e. the processing unit mentioned above) connected to the embedded unit 12. The translation unit is adapted to translate the first input information, i.e. scan codes for the keyboard 13 and/or the mouse and/or the touch pad, into the third input information, which is then sent to a terminal device such as the handset 20 via the interface unit 11.

Correspondingly, the handset 20 may comprise a language transformation unit (i.e. the conversion unit mentioned above). The language transformation unit is adapted to convert the received information, which has been translated by the translation unit, into information such as ASCII codes, which can be identified by a terminal device, processed and used by at least one program running on the operating system in the handset.

Figure 4:
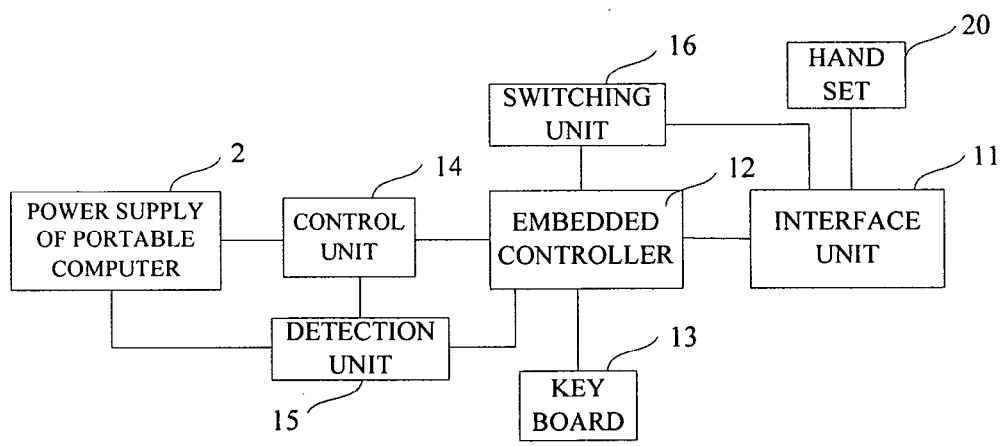
FIG. 4 is a structural diagram of a data processing device according to a fourth embodiment of the present invention.

Referring to FIG. 4, in which a structural diagram of a data processing device according to a fourth embodiment of the present invention is shown.

The data processing device according to the fourth embodiment of the present invention may be embodied as a portable computer. The portable computer in this embodiment differs from those of the second and third embodiments in that the portable computer 1 further comprises a first switching unit 16 connected to the embedded controller 12.

The first switching unit 16 is adapted to switch the input devices such as the keyboard 13 and/or the mouse and/or the touch pad and the like into an input mode, in which a terminal device such as the handset 20 or the handheld computer may perform an input, and to switch the input devices into an input mode, in which the portable computer (i.e. a central processor) performs an input.

With the first switching unit 16, the present invention may perform an input mode switch more accurately.

In order to facilitate users learning about the current input mode of the handset or the handheld computer, the input device comprises an indicating device such as an indicator light, connected to the first switching unit.

Particularly, the indicating device may be an indicator light and other indicating devices, for facilitating the users to learn about the current input mode.

The portable computer further comprises a second switching unit (not shown in the drawing figures) connected to the embedded controller. The second switching unit is adapted to confirm whether the input devices are connected to the terminal device.

Particularly, the second switching unit may be a switching controller connected to the embedded controller and the host of the portable computer.

The switching controller is mainly adapted to perform a switching after the portable computer has been powered up. There is only a set of input devices, the user can not know whether the current set of input devices is operating for the connected portable computer or for the connected terminal devices in advice. In this case, the second switching unit (i.e. a trigger selection unit) is needed.

Particularly, the portable computer 1 requires a USB controller as an interface with terminal devices such as the handset 20 or a handheld computer. One end of the USB controller is connected to the embedded controller 12 and the other end is connected to a south bridge, and a switching controller is connected. When the system is powered on, the embedded controller 12 may control such a bypass, that is, the USB controller is directly connected to the USB of the portable computer so that the handset 20 or the handheld computer may directly connect to and communicate with the USB interface of the portable computer.

Particularly, the switching controller may be a hot key. In this case, when it is needed to perform a switching between an input mode, in which the handset 20 performs an input, and an input mode, in which the portable computer performs an input, such a hot key may be used to perform the switching.

In the following, a detailed explanation will be provided with reference to FIG. 5 in order to more clearly describe how to use the data processing device according to the embodiment of the present invention.

Figure 5:
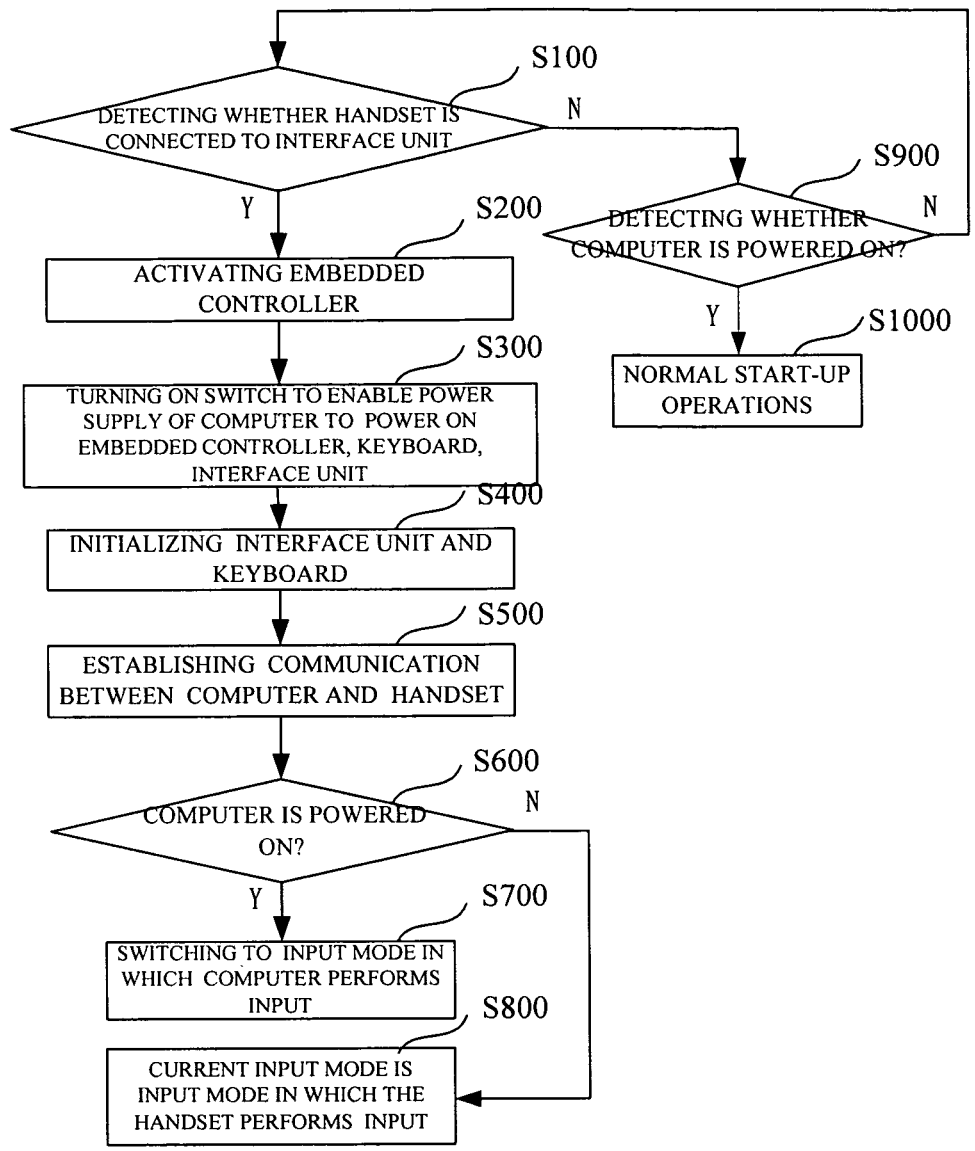
FIG. 5 is a method flow chart for the data processing method according to the embodiment of the present invention.

Referring to FIG. 5, in which a flow chart of the data processing device according to the embodiment of the present invention is shown.

An operating procedure for performing an input by the input device of the portable computer according to the embodiment of the present invention comprises the following steps:

step S100 of detecting whether there are other devices connected to the interface unit, if yes, the procedure proceeding to step S200, otherwise to step S900, here the other devices particularly being an interface unit inputting information-enabled terminal device such as a handset or a handheld computer;

step S200 of activating the embedded controller, specifically, the embedded controller 12 being activated when the handset 20 or the handheld computer is connected to the interface unit 11;

step S300 of turning on the control unit to enable the power supply of the computer supply power to the embedded controller (before turning on the control unit, the embedded controller has been supplied with low current), the keyboard and the interface unit, particularly, turning on the control unit 14 to enable the power supply 2 of the portable computer to supply power to the embedded controller 12, the keyboard 13 and the interface unit 11;

step S400 of initializing the interface unit and the keyboard, particularly, initializing the interface unit 11 and the keyboard 13; and step S500 of establishing a communication between the computer and the handset, particularly, establishing a communication between the portable computer and the handset 20, through which the embedded controller 12 converts the first input information obtained at the keyboard 13 or other input devices into the third input information and sends the third input information to the handset 20 and the like via the interface unit 11.

Moreover, the operating procedure further comprises the following steps:

step S600 of determining whether the computer is powered on, if yes, the procedure proceeding to step S700, otherwise to step S800;

step S700 of switching to an input mode in which the computer may perform an input, particularly, when the portable computer is powered on;

step S800, in which the current input mode is an input mode in which the handset may perform an input;

when the portable computer is powered off, the current input mode is the input mode in which the handset performs an input. The embedded controller 12 converts the first input information obtained at the keyboard 13 or other input devices as the second input information and sends it to the central processor of the portable computer;

step S900 of performing normal start-up operations, particularly, the portable computer may perform normal start-up operations when the interface unit 11 is not connected to the handset 20 or the handheld computer.

The present invention further provides a data processing method for solving the inconvenient operations of the terminal devices such as the handsets and the like.

Figure 6:
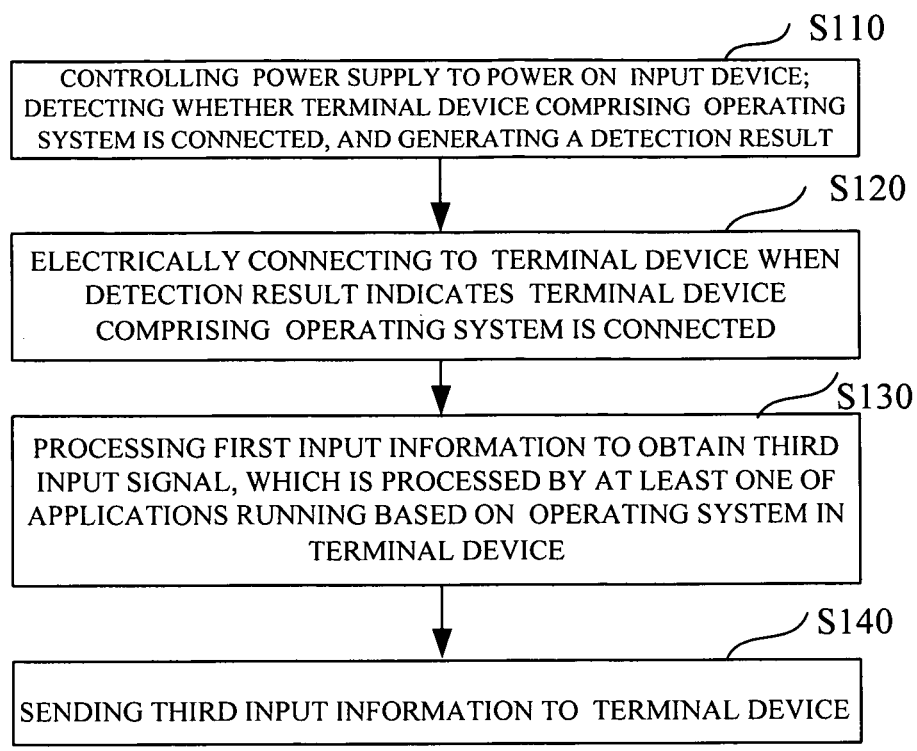
FIG. 6 is a flow chart of a data processing method according to an embodiment of the present invention.

Referring to FIG. 6, in which a flow chart of the data processing method according to the embodiment of the present invention in shown.

The data processing method according to the embodiment of the present invention is applied in a data processing device comprising a power supply, an embedded controller, an input device and a central processor. When the data processing device is powered on, the embedded controller is adapted to control the power supply to supply power to the input device and the central processor; process first input information, which is generated when the input device is operated by a user, as the second information, which can be identified by the central processor; and sent the second information to the central processor.

When the data processing device is powered off or sleeping, the data processing method according to the embodiment of the present invention comprises the following steps:

step S110 of controlling the power supply to supply power to the input device, detecting whether a terminal device comprising an operating system is connected, and generating a detection result;

step S120 of electrically connecting to the terminal device (i.e. establishing a communication with the terminal device) when the detection result indicates that the terminal device comprising the operating system is connected;

step S130 of processing the first input information to obtain the third input information, which can be processed by at least one program running on the operating system in the terminal device; and step S140 of sending the third input information to the terminal device.

The data processing method according to the embodiment further comprises: controlling the power supply to supply power to the input device; detecting whether a terminal device comprising an operating system is connected and generating a detection result; electrically connecting to the terminal device (establishing a communication with the terminal device) when the detection result indicates that the terminal device comprising the operating system is connected; processing the first input information to obtain third input information, which can be processed by at least one program running based on the operating system in the terminal device; and sending the third input information to the terminal device.

In this way, the input devices such as the keyboard and/or a mouse and/or a touch pad and the like may normally operate when the data processing device is powered off or sleeping. Then, the first input information input by the keyboard and/or the mouse and/or the touch pad is converted into the third input information, and the third input information is sent to the terminal device for use when the terminal device such as a handset or a handheld computer performs an input.

The portable computer 11 as mentioned in the embodiment of the present invention may be in any form mentioned above, thus unnecessary details will not be given.

The above are only preferable embodiments of the present invention, thus are not construed as limiting the scope of the present invention. Any modifications, substitutions or improvements made within the spirit and principle of the present invention shall fall into the protection scope of the present invention.

What is claimed is:

1. A data processing device, comprising:
    a power supply;
    an input device adapted to generate first input information under an operation from a user;
    a central processor;
    an embedded controller, connected to the power supply, the input device and the central processor, respectively;
    wherein when the data processing device is powered on, the embedded controller is adapted to control the power supply to supply power to the input device and the central processor; process the first input information as second information, which can be identified by the central processor; and send the second information to the central processor;
    and wherein when the data processing device is powered off or sleeping, the embedded controller is adapted to control the power supply to supply power to the input device; detect whether a terminal device comprising an operating system is connected and generate a detection result; electrically connect to the terminal device when the detection result indicates that the terminal device comprising the operating system is connected; process the first input information to obtain third input information, which can be processed by at least one program running based on the operating system in the terminal device; and send the third input information to the terminal device.

2. A data processing device as set forth in claim 1, wherein the data processing device further comprises:
    an interface unit connected to the embedded controller, the interface unit being adapted to connect to the terminal device.

3. A data processing device as set forth in claim 1, wherein the data processing device further comprises:
    a switching unit connected to the interface unit, the central processor and the embedded controller, respectively,
    and wherein the embedded controller is adapted to control the switching unit to connect to the central processor when the data processing device is powered on, and to control the switching unit to connect to the interface unit when the data processing device is powered off.

4. A data processing device as set forth in claim 3, wherein the data processing device further comprises:
    a trigger selecting unit connected to the embedded controller, the trigger selecting unit being adapted to obtain a trigger command from the user, and
    and wherein the embedded controller is adapted to control the switching unit to connect to the central processing based on a first trigger command and control the switching unit to connect to the interface unit based on a second trigger command, when the data processing device is powered on.

5. A data processing method, wherein the method is applied in a data processing device comprising a power supply, an embedded controller, an input device and a central processor,
    wherein when the data processing device is powered on, the embedded controller is adapted to control the power supply to supply power to the input device and the central processor;
    process first input information, which is generated when the input device is operated by a user, as second information that can be identified by the central processor; and send the second information to the central processor;
    and wherein when the data processing device is powered off or sleeping, the method comprises steps of:
    controlling the power supply to supply power to the input device; detecting whether a terminal device comprising an operating system is connected, and generating a detection result;
    electrically connecting to the terminal device when the detection result indicates that the terminal device comprising the operating system is connected;
    processing the first input information to obtain third input information, which can be processed by at least one program running based on the operating system in the terminal device; and
    sending the third input information to the terminal device.

* * * * *